United States Patent [19]

Hsueh

[11] Patent Number: 4,582,337
[45] Date of Patent: Apr. 15, 1986

[54] ANTI-SWAY TRAILER HITCH

[76] Inventor: Paul Y. J. Hsueh, 3135 Concord Blvd., Concord, Calif. 94519

[21] Appl. No.: 616,252

[22] Filed: May 30, 1984

[51] Int. Cl.$^4$ .................... B60D 1/00; B60D 53/06
[52] U.S. Cl. .................................................. 280/446 B
[58] Field of Search .............. 280/446 B, 446 R, 447, 280/459, 462, 467, 488

[56] References Cited

U.S. PATENT DOCUMENTS

| 1,389,840 | 9/1921 | Neely | 280/446 R |
|---|---|---|---|
| 1,998,032 | 4/1935 | Tonjes | 280/467 |
| 2,524,312 | 10/1950 | Garnett | 280/446 R |
| 2,653,032 | 9/1953 | Ellis | 280/459 |
| 2,723,134 | 11/1955 | Antes | 280/488 |

FOREIGN PATENT DOCUMENTS

| 556290 | 9/1943 | United Kingdom | 280/459 |
|---|---|---|---|
| 887577 | 1/1962 | United Kingdom | 280/447 |

Primary Examiner—John A. Pekar
Attorney, Agent, or Firm—Harvey B. Jacobson

[57] ABSTRACT

A hitch connection is provided for use between a towing vehicle and a trailer and includes structure whereby slight right and left lateral movement of the forward end of the towing vehicle will not be translated into left and right lateral movement, respectively, of the forward end of the trailer and thereby eliminates the tendency of a trailer to sway back and forth during crosswind gusts and as a result of the slip stream of a large vehicle such as a tractor and semi-trailer combination passing a lighter vehicle towing a trailer.

14 Claims, 5 Drawing Figures

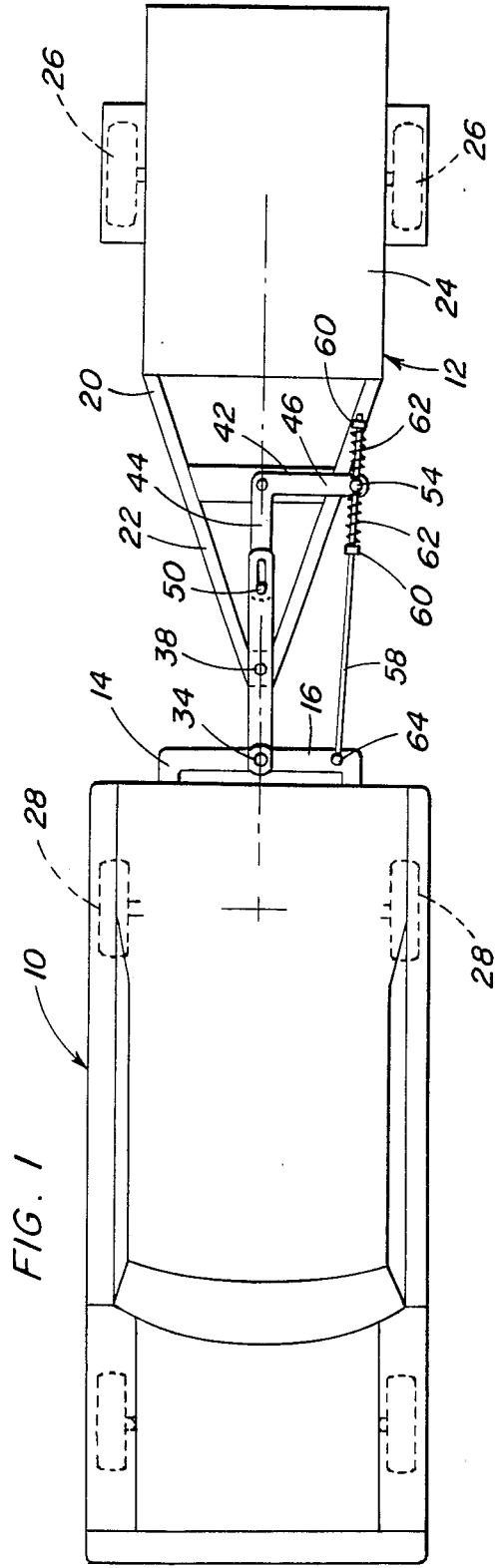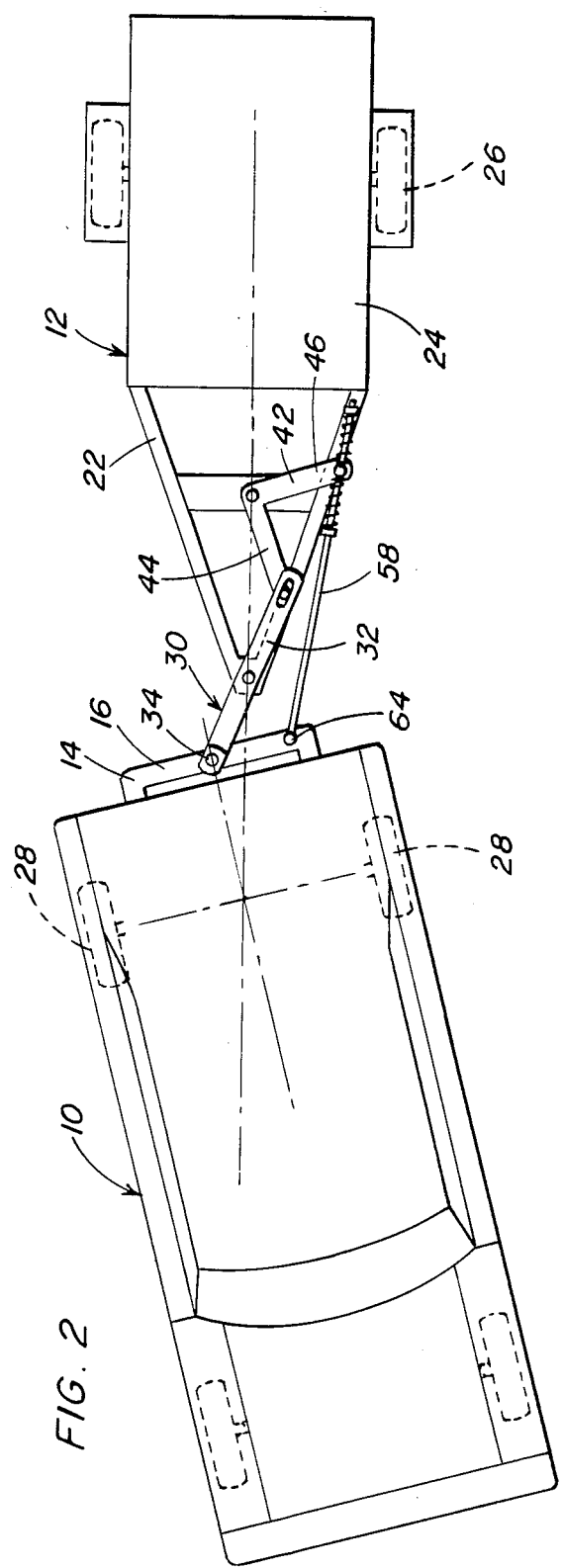

ANTI-SWAY TRAILER HITCH

BACKGROUND OF THE INVENTION

Inasmuch as most passenger vehicles and the like include rear overhang portions which project considerably rearward of the rear wheels of the vehicle and trailer hitches are constructed in a manner such that the forward tongue portion of a trailer towed behind such vehicles are actually coupled to the vehicles, at a point spaced slightly rearward of the rear bumpers of the vehicles any slight right and left lateral shifting of the forward end of the towing vehicle results in left and right lateral shifting, respectively, of the forward end of the trailer. This operational feature of the combination of a passenger vehicle and a trailer being towed there behind can be very dangerous, especially if the trailer is not properly loaded in a manner such that the gross load represented by the trailer has its center of gravity disposed forward of the wheels of the trailer. This is especially true when a trailer being towed has a large side elevational area upon which crosswind gusts and slip stream blasts may react. Accordingly, a need exists for a hitch connection between a vehicle and a trailer which will eliminate the sway tendencies of the vehicle and trailer combination as a result of slight lateral shifting of the forward end of the towing vehicle.

Examples of various different forms of anti-sway trailer hitches including some of the general structural and operational features of the instant invention are disclosed in U.S. Pat. Nos. 2,201,660, 2,913,256, 3,254,905, 3,785,680, 3,787,077 and 3,825,282.

BRIEF DESCRIPTION OF THE INVENTION

The anti-sway trailer hitch of the instant invention is constructed in a manner whereby slight lateral deflections to the right and left by the front end of a towing vehicle will not be directly transmitted to the trailing vehicle in the form of left and right lateral swaying movements.

The anti-sway trailer hitch is relatively simple in construction and includes only three major components other than the usual forwardly projecting trailer tongue assembly and may therefore be readily incorporated into the manufacture of new trailers and trailer hitches as well as retrofitted to existing trailers and trailer hitches.

The main object of this invention is to provide an anti-sway trailer hitch which may be utilized to couple a trailer to a towing vehicle in a manner such that slight lateral left and right movements of the forward end of the towing vehicle will not be transferred into lateral left and right movements, respectively, of the forward end of the towing vehicle.

Another object of this invention is to provide an anti-sway trailer hitch which may be readily retrofitted to existing trailer hitches and trailers.

Still another object of this invention is to provide a trailer hitch including an adjustment feature enabling adjustment of the anti-sway action of the hitch in accordance with the gross load represented by the associated trailer.

A final object of this invention to be specifically enumerated herein is to provide an anti-sway trailer hitch in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of a conventional towing vehicle and trailer combination incorporating the anti-sway trailer hitch of the instant invention;

FIG. 2 is a top plan view similar to FIG. 1 but illustrating the manner in which the forward end of the trailer continues to move in a straight line path even though the forward end of the towing vehicle has been slightly shifted to the left from a straight line path of movement;

DETAILED DESCRIPTION OF THE INVENTION

Figure 3:
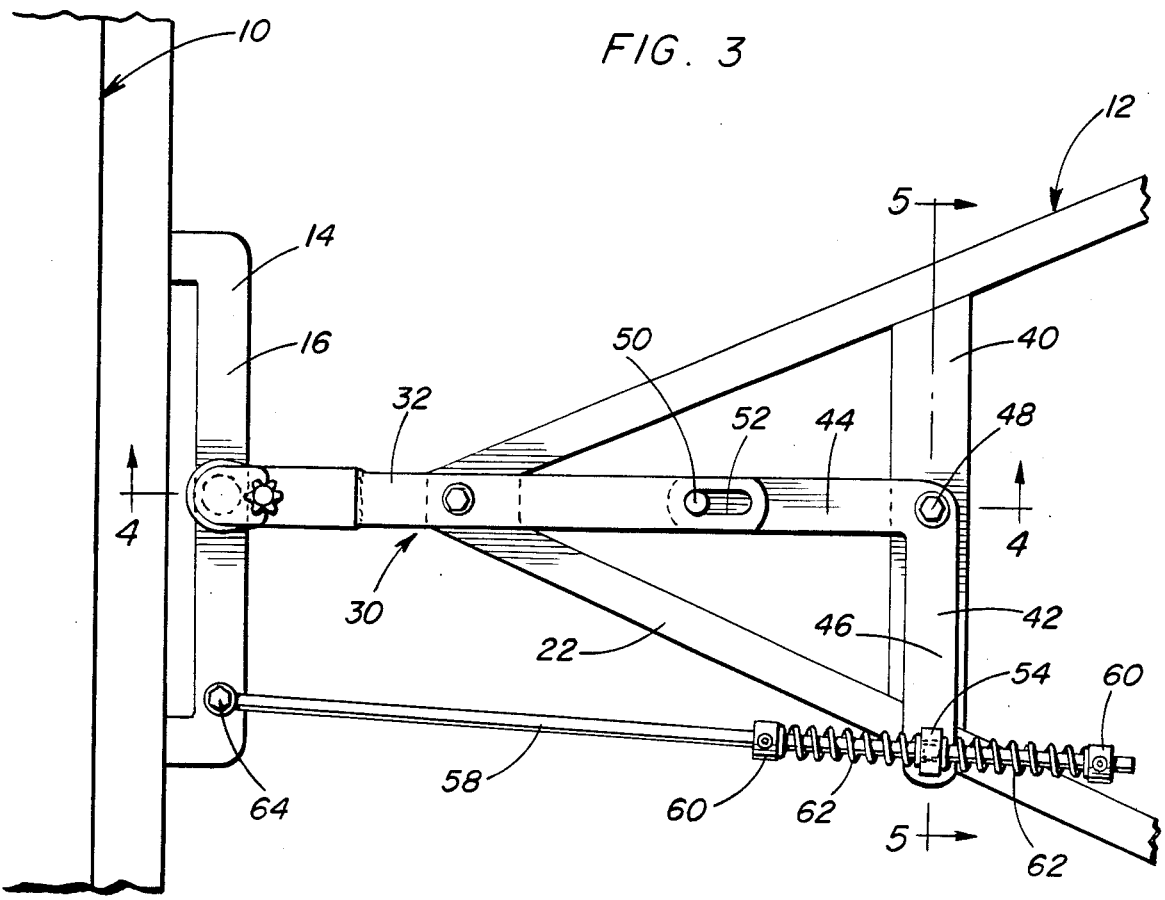
FIG. 3 is a fragmentary enlarged top plan view of the adjacent portion of the towing vehicle and trailer and illustrating the hitch construction in operative association with the towing vehicle trailer hitch and the forwardly projecting tongue assembly of the trailer.
Figure 4:
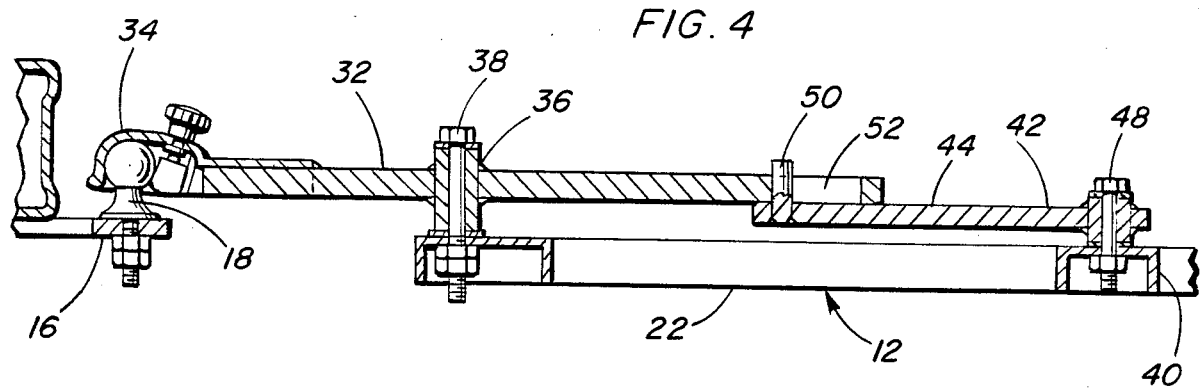
FIG. 4 is a fragmentary longitudinal vertical sectional view taken substantially upon the plane indicated by the section line 4—4 of FIG. 3.
Figure 5:
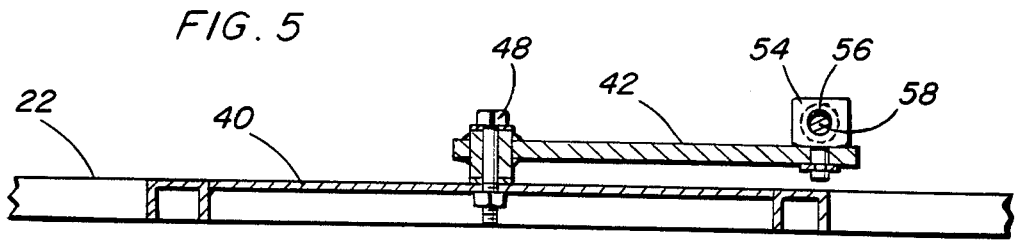
FIG. 5 is a fragmentary transverse vertical sectional view taken substantially upon the plane indicated by the section line 5—5 of FIG. 3.

Referring now more specifically to the drawings the numeral 10 generally designates a towing vehicle in the form of a conventional passenger vehicle and a box body equipped trailer is referred to in general by the reference numeral 12. The vehicle 10 includes a rear mounted trailer hitch 14 incorporating a transverse bar 16 from which a conventional ball hitch member 18 is supported.

The trailer 12 includes a frame 20 including a forwardly projecting tongue assembly 22 and it may be seen from FIGS. 1 and 2 of the drawings that the longitudinal center of the box-type body 24 supported from the frame 20 is disposed at least slightly forward of the axle of the trailer from which opposite side wheels 26 are journalled. This placement of the body 24 relative to the wheels 26 and the inclusion of the forwardly projecting tongue assembly 22 tends to ensure that a load supported within the body 24 will exert a reasonable downward force on the forward end of the tongue assembly 22 so that when the tongue assembly 22 is coupled to the rear of the vehicle 10, the tendency of the trailer 12 to sway back and forth will be reduced.

Conventionally the tongue assembly 22 is provided with a slightly forwardly projecting extension including a socket hitch member releasably coupled to the ball hitch member 18.

However, inasmuch as the bar 16 and ball hitch member 18 are disposed appreciably rearward of the rear wheels 28 of the vehicle 10 any tendency of the forward end of the vehicle to shift laterally to the right and left will result in the ball hitch member 18 being shifted to the left and right, respectively, and thus the forward end of the tongue assembly 22 to be shifted to the right and left. This inherent operation of a vehicle and trailer combination tends to amplify the swaying movements exerted on the vehicle and trailer combination by crosswind gusts and slip stream blasts of large vehicles passing the vehicle and trailer combination. Accordingly, even if the trailer 12 is properly loaded, a swaying movement may be imparted to the vehicle 10 and trailer 12.

In order to eliminate such swaying movements the anti-sway trailer hitch 30 of the instant invention has been provided. The hitch 30 includes an elongated hitch bar including first connecting means in the form of a socket hitch member 34 supported at one end and utilized to removably universally couple the corresponding end of the bar 32 to the ball hitch member 18. The approximate longitudinal midportion of the bar 32 includes a vertical sleeve secured therethrough and a vertical pivot fastener 38 is secured through the sleeve and the forward apex portion of the tongue assembly 22 pivotally connecting the intermediate length portion of the bar 22 from the forward end of the tongue assembly 22 for oscillation about an upstanding axis.

The tongue assembly 22 includes a transverse brace member 40 spaced rearward of the point of pivotal connection of the bar 32 to the forward portion of the tongue assembly 22 and a control member 42 in the form of a bell crank incorporating right angularly disposed arms 44 and 46 is pivotally supported from the midportion of the brace member 40 by a pivot fastener 48. The arm 44 projects forwardly from the pivot fastener 48 and includes an upstanding pin 50 on its forward end rotatably and slidably received in a longitudinal slot 52 formed in the rear end of the bar 32. In addition, the arm 46 extends laterally outward to the left from the pivot fastener 48 and rotatably supports a fitting 54 therefrom for angular displacement about a vertical axis. The fitting 54 is carried by the outer end of the arm 46 and defines a horizontal bore 56 extending therethrough.

An elongated cylindrical link bar 58 has its rear end portion slidably and rotatably received through the bar 56 and a pair of stop collars 60 are mounted on the bar 56 on opposite sides of the fitting 54 and a pair of compression springs 62 are disposed on the bar 58 on opposite sides of the fitting 54. The compression springs 62 are at least slightly compressed and have their adjacent ends abutted against remote sides of the fitting 54 while their remote ends are abutted against adjacent sides of the collars 60. Thus, longitudinal shifting of the bar 58 relative to the fitting 54 is possible but yieldingly resisted by the springs 62.

The forward end of the bar 58 is pivotally anchored as at 64 to the left end of the transverse bar 16. In this manner, the bar 58 substantially parallels the bar 32 and the arm 44 when the bar 32 and arm 44 are substantially aligned.

The pivotal connection at 54 may be a ball type universal pivotal connection and structure may be provided on the free end of the pin 50 to prevent upward displacement of the rear end of the bar 32 relative to the pin 50. In addition, various different forms of pivotal connections may be substituted for the pivot fasteners 38 and 48 and any suitable form of socket hitch member may be used on the forward end of the bar 32. Still further, other hitch member constructons may be used in lieu of the socket hitch member 34 and the ball hitch member 18, if desired.

With attention now invited more specifically to FIGS. 1 and 2 of the drawings, it will be seen that straightforward movement of the vehicle 10 and trailer 12 maintains the socket hitch member 34, the pivot fastener 38 and the pin 50 along the coinciding longitudinal center lines of the vehicle 10 and trailer 12. However, should the forward end of the vehicle 10 be laterally deflected to the left as viewed in FIG. 2 of the drawings the socket hitch member 34 is displaced to the right of the center line of the previous straight path of movement of the vehicle and trailer combination with the result that the forward end of the tongue of a conventional trailer would be displaced to the right.

However, with the anti-sway hitch 30, lateral displacement of the forward end of the vehicle 10 to the left causes the pivot connection at 64 to be displaced rearward relative to the ball member 18 and thus a rearward thrust to be applied on the free end of the arm 46 by the bar 58 and the collars 60 and springs 62. The rearward thrust on the free end of the arm 46 translates into a counterclockwise angular displacement of the bell crank 42 as viewed in FIG. 2 of the drawings and thus a displacement of the rear end of the bar 32 to the left of the center line of the previous straight line path of movement of the vehicle and trailer. This in turn causes the forward end of the bar 32 to be displaced to the right of the aforementioned center line with the effect that the pivot fastener 38 remains substantially on the center line of the previous straight line path of movement of the vehicle 10 and trailer 12. Therefore, although the forward end of the vehicle 10 has been displaced to the left and may be immediately steered back to the right the trailer 12 will experience continued straight line movement. Of course, if the wheels of the vehicle 10 in FIG. 2 are turned to the left in order to execute a left hand turn the trailer 12 will follow the vehicle 10 through the turn.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A vehicle combination including a forward towing vehicle including a rear portion and a rear trailing vehicle disposed there behind including a forward portion, an anti-sway hitch constructon connecting said trailing vehicle to the rear of said towing vehicle, said hitch construction including an elongated hitch bar, first connecting means pivotally attaching one end of the bar to the rear towing portion of said vehicle, means pivotally anchoring an intermediate length portion of said bar to the forward portion of said trailing vehicle for angular displacement of said hitch bar about a first upstanding axis relative to said forward portion, a control member pivotally supported from said forward portion of said trailing vehicle for angular displacement relative thereto about a second upstanding axis spaced rearward of said first axis, second connecting means pivotally and slidably connecting the other end of said bar to said control member at a point spaced forward of said second axis, control means connected between said rear portion and said control member, said control means including an elongated link, means pivotally connecting one end of said link to said rear portion for angular displacement about a third upstanding axis spaced to one lateral side of said first connecting means, means pivotally connecting the other end of said link to said control member for angular displacement about a fourth upstanding axis spaced to the same lateral side of said second axis.

2. The combination of claim 1 wherein said control means includes means permitting, but yieldingly resisting, increases and decreases in the effective spacing between said third and fourth axes.

3. The combination of claim 2 wherein said control means includes a slidable, spring resisted connection between said other end of said link and said fourth axis.

4. The combination of claim 3 wherein said second connecting means includes a pin-and-slot connection.

5. The combination of claim 4 wherein said pin-and-slot connection includes a pin carried by said other end of said bar and a slot formed in said control member extending generally radially of said second axis.

6. The combination of claim 1 wherein said second connecting means includes a pin-and-slot connection.

7. The combination of claim 6 wherein said pin-and-slot connection includes a pin carried by said other end of said bar and a slot formed in said control member extending generally radially of said second axis.

8. The combination of claim 7 wherein said control means includes means permitting, but yieldingly resisting, increases and decreases in the effective spacing between said third and fourth axes.

9. The combination of claim 1 wherein said control member comprises a bell crank.

10. A vehicle combination including a forward towing vehicle having a rear hitch portion disposed rearward of the rear wheels of the vehicle and a trailer including rear wheels and a forwardly projecting tongue assembly, said towing vehicle and trailer including generally aligned longitudinal center lines upon which said rear hitch portion and tongue assembly are generally centered, said tongue assembly including a forward hitch portion shiftable laterally relative to said tongue assembly or opposite sides of the center line of said trailer, a trailer hitch construction including coupling means operatively unversally coupling said forward hitch portion to said rear hitch portion, said trailer hitch construction including shift means connected between said towing vehicle and forward hitch portion operative to shift said forward hitch portion to the right and left sides of said trailer center line relative to said tongue assembly responsive to displacement of the front end of said vehicle to left and right, respectively, of the line of said trailer.

11. The vehicle combination of claim 10 wherein said shift means includes force means yieldingly resisting shifting of said forward hitch portion relative to said tongue assembly from a generally centered position thereon.

12. The vehicle combination of claim 11 wherein said force means includes means operative to vary the resistance generated by said force means to resist shifting of forward hitch portion relative to said tongue assembly.

13. A vehicle combination including a forward towing vehicle having a rear hitch portion disposed rearward of the rear wheels of the vehicle and a trailer including rear wheels and a forwardly projecting tongue, said towing vehicle and trailer including generally aligned longitudinal center lines upon which said hitch portion and tongue are generally centered, a forward trailer hitch including coupling means peratively universally coupling said tongue to said rear hitch portion, support means supporting said forward trailer hitch from said tongue for shifting relative to said tongue to the right and left of said trailer center line responsive to displacement of the front of the vehicle to the left and right, respectively of the trailer center line, said support means further including adjustable tension spring means yieldingly biasing said forward hitch toward a centered position relative to said tongue, said support means further including means responsive to displacement of the front of said vehicle to the right and left of the center line of said trailer to increase the tension of said spring means to shift said forward trailer hitch from the left and right, respectively, of the center line of said trailer back toward said trailer center line.

14. The vehicle combination of claim 13 including means operative to selectively adjust the tension of said spring means independent of right and left displacement of the front said vehicle relative to said trailer of center line.

* * * * *